(12) United States Patent
Barr

(10) Patent No.: US 7,188,426 B2
(45) Date of Patent: Mar. 13, 2007

(54) INCLINATION SENSOR

(75) Inventor: Keith E. Barr, Los Angeles, CA (US)

(73) Assignee: Exelys LLC, Los Angeles, CA (US)

( * ) Notice: Subject to any disclaimer, the term of this patent is extended or adjusted under 35 U.S.C. 154(b) by 0 days.

(21) Appl. No.: 10/820,389

(22) Filed: Apr. 7, 2004

(65) Prior Publication Data
US 2004/0205973 A1 Oct. 21, 2004

Related U.S. Application Data

(60) Provisional application No. 60/463,267, filed on Apr. 15, 2003.

(51) Int. Cl.
*G01C 9/06* (2006.01)

(52) U.S. Cl. .................. 33/366.19; 33/366.11; 33/366.15; 33/366.22; 702/154

(58) Field of Classification Search ............ 33/366.19, 33/366.11, 366.15, 366.18, 366.21, 366.22, 33/366.25, 366.26; 324/663; 702/154
See application file for complete search history.

(56) References Cited

U.S. PATENT DOCUMENTS

| | | | | |
|---|---|---|---|---|
| 1,007,998 A | * | 11/1911 | Whalton ................... | 33/366.11 |
| 1,375,278 A | * | 4/1921 | Clayton .................... | 33/366.22 |
| 2,711,590 A | * | 6/1955 | Wilcox ..................... | 33/366.19 |
| 3,290,786 A | * | 12/1966 | Parkin ...................... | 33/366.12 |
| 3,442,023 A | * | 5/1969 | Remington ............... | 33/366.22 |
| 3,823,486 A | | 7/1974 | Bhat et al. | |
| 3,992,951 A | | 11/1976 | Erspamer et al. | |
| 4,028,815 A | | 6/1977 | Buckley et al. | |
| 4,167,818 A | * | 9/1979 | Cantarella et al. ....... | 33/366.14 |
| 4,422,243 A | | 12/1983 | Brunson et al. | |
| 4,503,622 A | | 3/1985 | Swartz et al. | |
| 4,521,973 A | * | 6/1985 | Wiklund et al. ......... | 33/366.19 |
| 4,624,140 A | * | 11/1986 | Ekchian et al. .......... | 33/366.19 |
| 4,707,927 A | | 11/1987 | Hiyama | |
| 4,846,954 A | * | 7/1989 | Ryan et al. ............... | 33/366.22 |
| 4,866,850 A | * | 9/1989 | Kelly et al. ............... | 33/366.22 |
| 4,912,662 A | * | 3/1990 | Butler et al. .............. | 33/366.19 |
| 4,937,518 A | * | 6/1990 | Donati et al. ............. | 33/366.19 |
| 5,150,104 A | | 9/1992 | Thomas et al. | |
| 5,180,986 A | | 1/1993 | Swartz et al. | |
| 5,237,753 A | * | 8/1993 | Carlson et al. ........... | 33/366.14 |
| 5,335,190 A | | 8/1994 | Nagle et al. | |
| 5,428,902 A | * | 7/1995 | Cheah ....................... | 33/366.14 |
| 5,432,503 A | | 7/1995 | Pekar | |
| 5,479,716 A | | 1/1996 | Murphy | |
| 5,612,679 A | | 3/1997 | Burgess | |
| 5,630,280 A | * | 5/1997 | Crossan, Jr. .............. | 33/366.11 |
| 5,662,535 A | | 9/1997 | Smith | |
| 5,731,761 A | | 3/1998 | Sychra | |
| 6,449,857 B1 | | 9/2002 | Anikolenko | |
| 6,453,571 B1 | * | 9/2002 | Crossan, Jr. .............. | 33/366.11 |
| D488,731 S | | 4/2004 | Barr | |

* cited by examiner

*Primary Examiner*—Richard Smith
*Assistant Examiner*—Travis Reis
(74) *Attorney, Agent, or Firm*—Morrison & Foerster LLP

(57) ABSTRACT

An electronic inclination sensor is provided for the determination and display of surface inclination and the direction of such inclination. The information regarding the inclination and direction of inclination can be displayed such that an end user can readily and easily comprehend and use the information without additional interpretation. Further, when the inclination is displayed in decimal values, a large range of inclination angles can be displayed with significant accuracy.

21 Claims, 7 Drawing Sheets

US 7,188,426 B2

INCLINATION SENSOR

CROSS-REFERENCE TO RELATED APPLICATIONS

This application claims the benefit of U.S. Provisional Application No. 60/463,267, filed Apr. 15, 2003, the disclosure of which is incorporated herein in its entirety as if fully set forth below.

BACKGROUND OF THE INVENTION

In the sport of golfing, when a golfer attempts to hit the ball into the hole on a putting green, slight angles of green surface inclination may severely affect the ball's trajectory. This is particularly true in those areas of the putting green that are close to the hole and in the path of the ball. Knowledge of the inclination of the green in this critical area prior to putting can be advantageous to the golfer, so that he may compensate for such inclination while hitting the ball. It can be difficult however, to visually determine the inclination of a golfing green at that spot which is close to the hole, particularly in situations where the green's entire topography is complicated by multiple, different inclinations distributed across its surface. Further, the flagpole, traditionally placed in the center of the hole, is only rarely precisely vertical, adding to the visual confusion while assessing the green's inclination.

BRIEF SUMMARY OF THE INVENTION

In accordance with embodiments of the present invention, an electronic device for the determination and display of surface inclination and the direction of such inclination is provided. The information regarding the inclination and direction of inclination can be displayed such that an end user can readily and easily comprehend and use the information without additional interpretation. Further, when the inclination is displayed in decimal values, a large range of inclination angles can be displayed with significant accuracy.

In accordance with further embodiments of the present invention, an inclination measurement and display device is provided. The device comprises an enclosure having a reference surface; an inclination sensor provided in the enclosure and being configured to measure a first electrical characteristic indicative of an inclination of the reference surface along a first axis and a second electrical characteristic indicative of an inclination of the reference surface along a second axis, wherein said inclination sensor outputs a first signal corresponding to the first measured electrical characteristic and a second signal corresponding to the second measured electrical characteristic; a processing module for receiving the first and second signals from the inclination sensor and processing the first and second signals to determine the overall angle of inclination and the direction of inclination of the reference surface; and a display for playing a numerical value corresponding to the overall angle of inclination and a directional indication corresponding to the two-dimensional direction of inclination.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE SEVERAL VIEWS OF THE DRAWING(S)

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Figure 1:
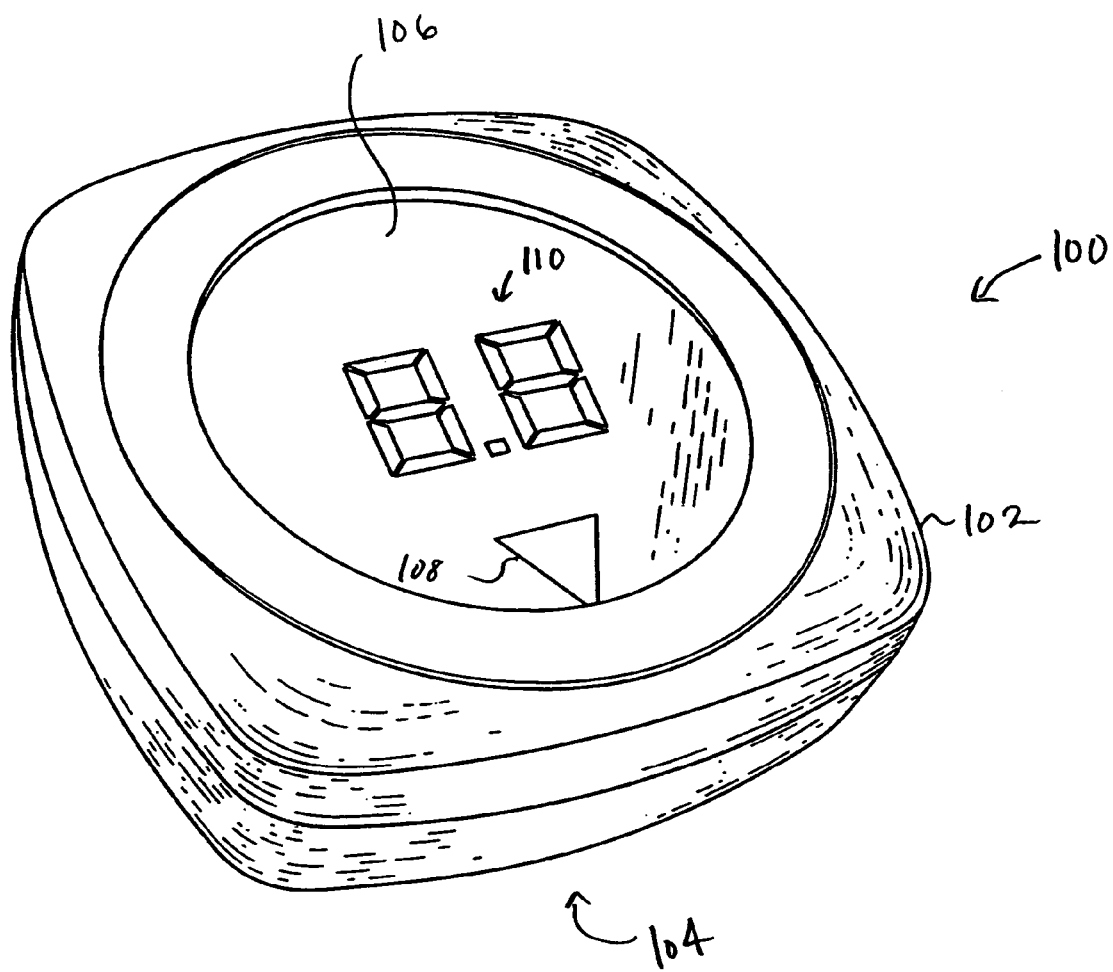
FIG. 1 is a perspective view of an inclination sensing device in accordance with embodiments of the present invention.

FIG. 1 is a perspective view of an inclination sensing device 100, in accordance with embodiments of the present invention. The inclination sensing device 100 may include a display 106 provided on the top surface of a small enclosure 102. The enclosure 102 includes a reference surface 104, shown in FIG. 1 as the bottom surface of the enclosure 102.

Figure 5:
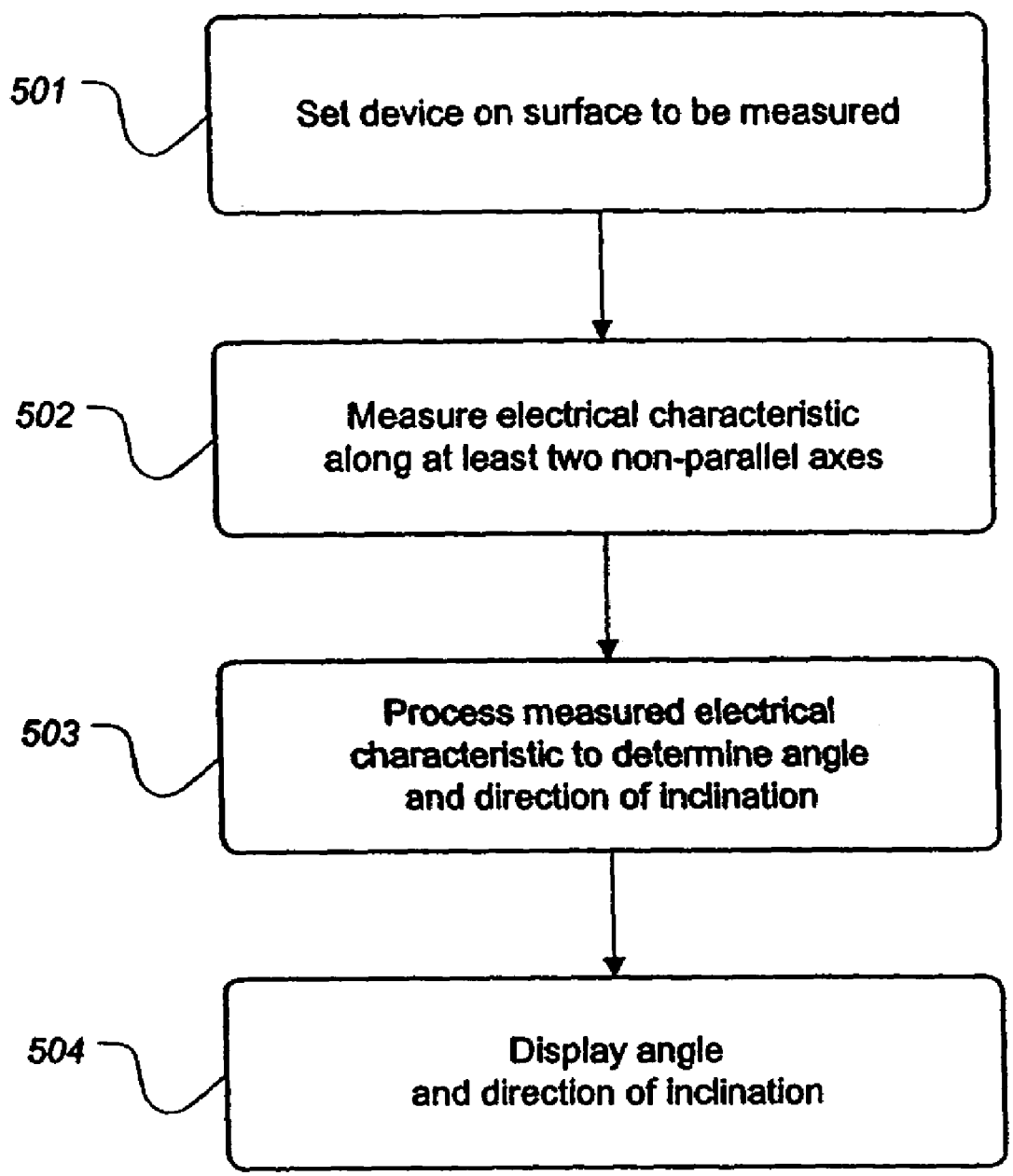
FIG. 5 is a flowchart of a method of measuring and displaying the angle and direction of inclination in accordance with embodiments of the present invention.

FIG. 5 is a flowchart of a method of measuring and displaying the angle and direction of inclination in accordance with embodiments of the present invention. In step 501, the inclination sensing device 100 is placed on the surface to be measured. This may be accomplished by positioning the reference surface 104 directly on the surface to be measured, such as the surface of the green immediately adjacent the golfer's ball. Next, in step 502, an electrical characteristic of the inclination sensor, such as capacitance, is measured. In step 503, the measured electrical characteristics are processed to determine the angle and direction of inclination. Finally, in step 504, the angle and direction of inclination are displayed.

Figure 2:
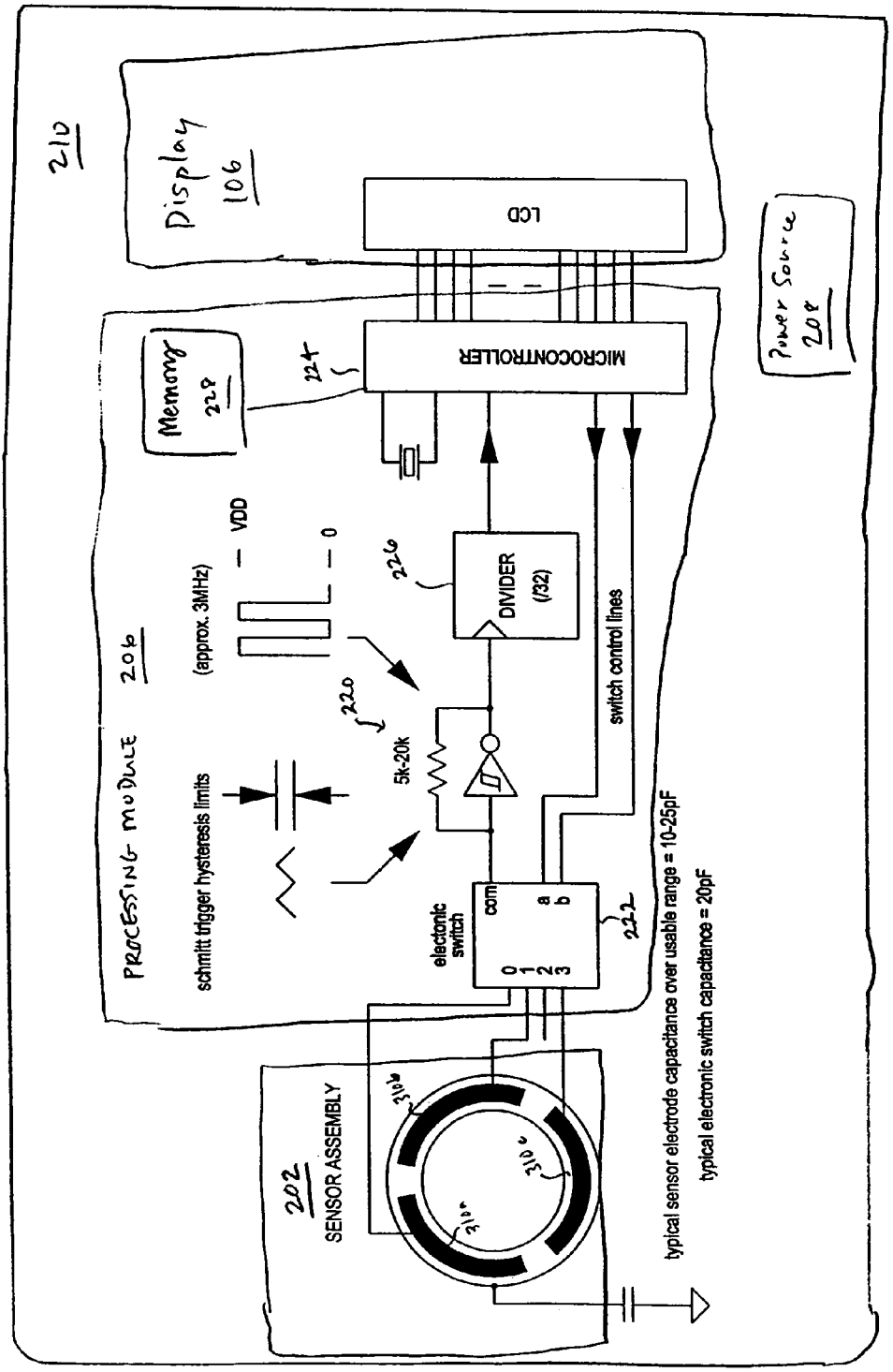
FIG. 2 is a simplified block diagram of the internal components of an inclination sensing device in accordance with embodiments of the present invention.

FIG. 2 shows a diagram of the internal components of an inclination sensing device 100, in accordance with embodiments of the present invention. The inclination sensing device 100 may include an inclination sensor 202, a processing module 206, and a display 106. A power source 208 may be provided to power the display 106 and the processing module 206.

In this embodiment, an electrical characteristic of the inclination sensor 202 indicative of the inclination of the reference surface 104 is measured by the processing module 206. The processing module 206 then outputs signals corresponding to angle and direction of the inclination to drive the display 106 (shown as an LCD display in FIG. 1) to simultaneously indicate the inclination angle in decimal degrees and the direction of inclination by the display of an arrow pointer 108.

The inclination sensor 202 comprises a biaxial inclination sensor for determining inclination on two non-parallel axes. Each of these non-parallel axes can be aligned orthogonal to a reference axis perpendicular to the reference surface 104. The biaxial inclination sensor 202 provides a signal to the processing module 206 in response to sensor inclination. In various embodiments, the biaxial inclination sensor 202 may comprise two separate single axis inclination devices, or a single device capable of determining inclination on two axes simultaneously. It will be understood that the reference surface is the plane for which the measurement of inclination is desired. In some embodiments, the reference surface need not be a physical surface and can be, for example, a plane defined by the support feet of the device.

Figure 3:
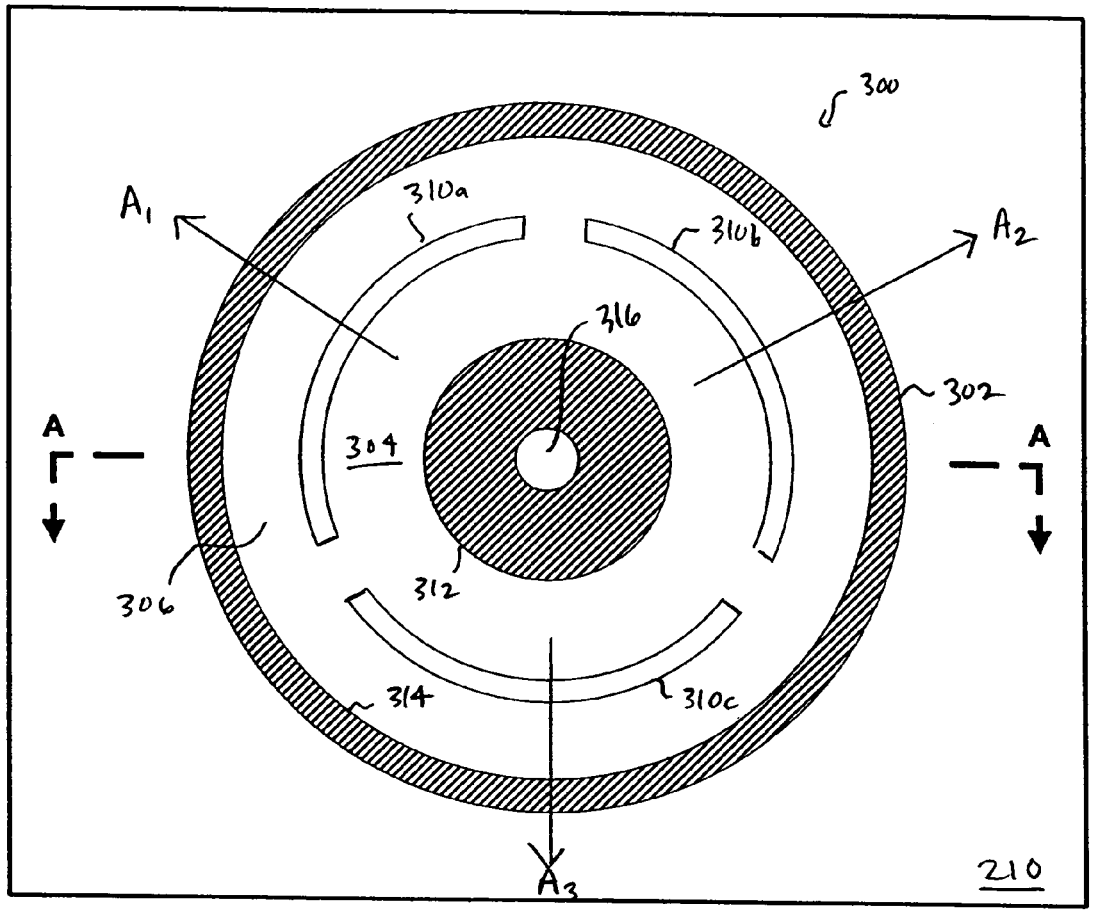
FIG. 3 is a top cross-sectional view of an exemplary inclination sensor in accordance with embodiments of the present invention.
Figure 4A:
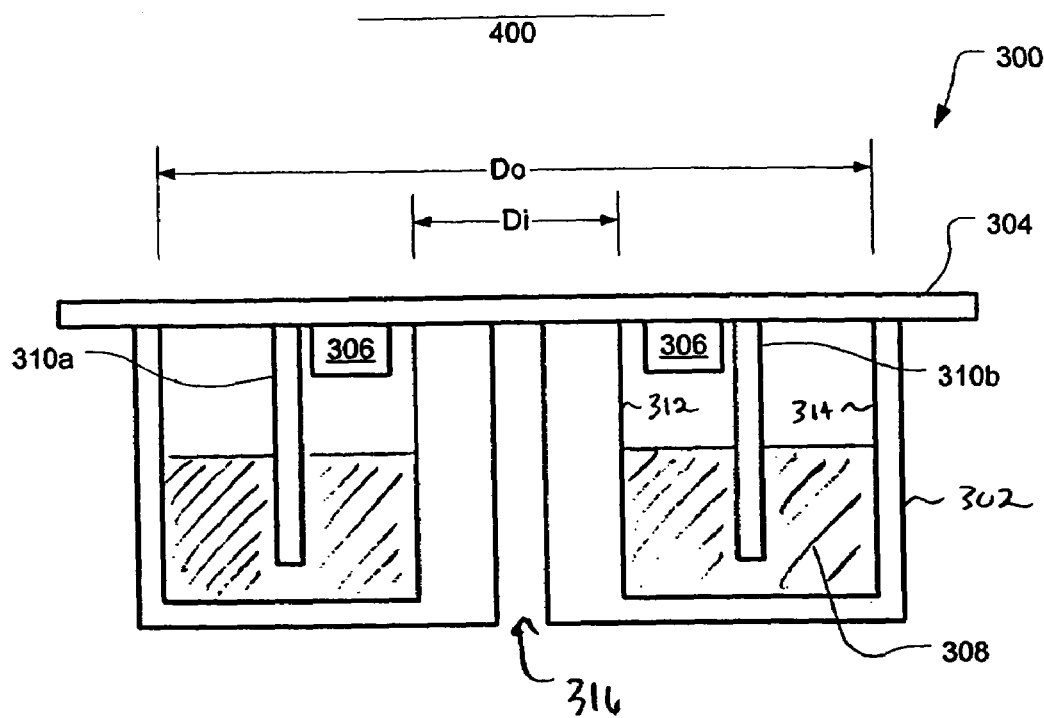
FIGS. 4A–4B are cross-sectional side views of an inclination sensor in accordance with embodiments of the present invention.
Figure 4B:
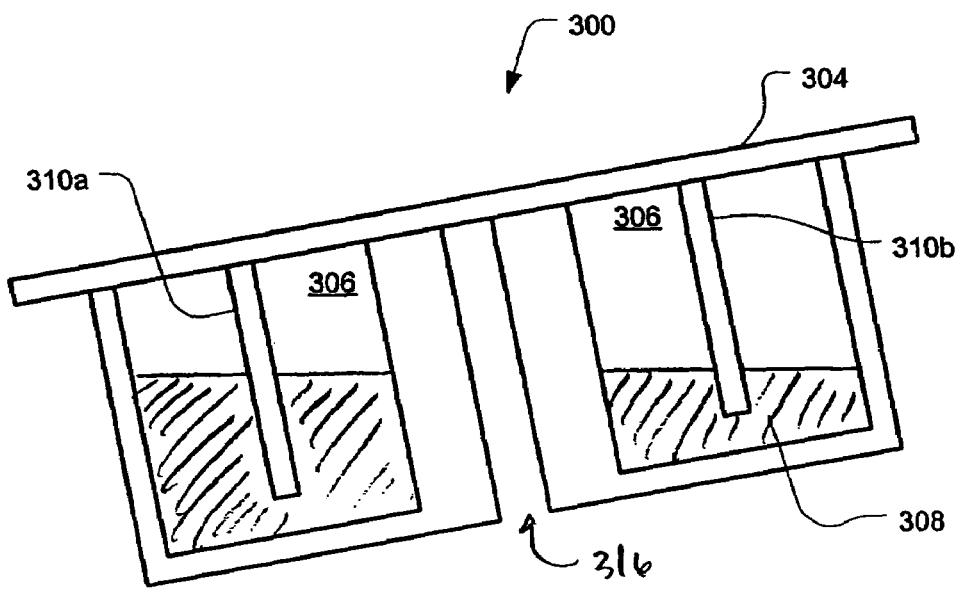

FIG. 3 shows a top view of an exemplary inclination sensor 300 in accordance with embodiments of the present invention. FIGS. 4A–4B are cross-sectional side views of the inclination sensor 300 taken along line A—A in FIG. 3. The inclination sensor 300 comprises a chamber housing 302 coupled with a chamber base 304 that has a surface parallel to the reference surface 104. Inclination sensor 300 determines the inclination of the reference surface 104 by measuring an electrical characteristic between electrodes immersed in a fluid 308 contained within the chamber 306 defined by the chamber housing 302 and the chamber base 304. By providing electrodes 310a–310c along at least two non-parallel axes within the sensor 300, the two-dimensional inclination of the reference surface 104 can be determined, as will be described in greater detail below.

In the illustrated embodiment, the chamber base 304 is part of a printed circuit board 210 having the various components of the inclination sensing device 100 provided thereon. The printed circuit board 210 is mated with the chamber housing 302 and sealed to prevent leakage of the fluid 308 contained in chamber 306. The chamber housing 302 can be attached to the printed circuit board 210 by passing a screw or bolt through the printed circuit board 210 and through center aperture 316 in the chamber housing 302. In alternative embodiments, the chamber base 304 need not be a part of the circuit board 210 and can be separately formed component.

As shown in FIGS. 3–4, three electrodes 310a–310c are mounted onto the chamber base 304 such that they protrude into the chamber 306 and are partially immersed in the fluid 308 contained within the chamber 306. The fluid 308 can fill, for example, approximately 50% of the chamber 306. The chamber housing 302 can also be formed of or coated with a conductive material and can be electrically grounded or held at a stable potential so that the housing 302 can serve as a fourth electrode. The electrodes 310a–310c and the conductive housing 302 can be attached and electrically connected to electrical leads provided on the printed circuit board 210. The electrodes 310a–310c are otherwise not in contact with each other and also not in contact with the surrounding housing 302.

The chamber 306 has an annular shape defined by a circular inner wall 312 and a concentric circular outer wall 314 of the chamber housing 302. The top of the chamber 306 is provided by chamber base 304 and the bottom of the chamber 306 is provided by the housing 302. In one embodiment, the inner wall 312 has a diameter $D_i$=15 mm and the outer wall 314 has a diameter $D_o$=30 mm. Each of the electrodes 310a–310c comprises a curved plate arranged symmetrically within the chamber 306 and substantially equidistantly from the inner wall 312 and the outer wall 314 such that the three electrodes 310a–301c form a circular pattern concentric with the walls 312, 314 of the chamber housing 302. The electrodes 310a–310c need not be formed as curved plates and, in other embodiments, these electrodes be formed in a variety of different shapes, such as pins or rods, so long as they are capable of providing an accurate measurement of the monitored electrical characteristic.

In the embodiment shown, the fluid 308 contained within the chamber 306 is a dielectric fluid, such as, for example, water or propylene carbonate. The electrodes 310a–310c are positioned such that the capacitance between electrode pairs changes with the inclination of the sensor 300, due to movement of the dielectric fluid 308 contained within the chamber 306 and the corresponding change in immersion depth for each of the electrodes 310.

The electrodes 310a–310c may each be connected to an oscillator 220 that produces an output frequency that is inversely proportional to the electrode capacitance. The determination of the oscillator's period by the use of a counter can provide values that are directly proportional to electrode capacitance. An initial calibration process can be performed to match the ratios of those values with the corresponding inclination. Alternatively, the determination of the oscillator's frequency by using a counter to count the oscillator's output cycles in a predetermined period of time can provide values that are inversely proportional to electrode capacitance.

In FIG. 4A, the inclination sensor 300 is level, so chamber base 304 is parallel with the horizon, indicated by line 400. Accordingly, the surface of the dielectric fluid 308 is also parallel with base 304 such that each of the electrodes 310a–310c is equally immersed in the fluid 308. In this position, the capacitance between the first electrode 310a and the chamber housing 302 is $C_0$. Similarly, because each electrode 310a–310c is equally immersed in the dielectric fluid 306, the capacitance between each of the electrodes 310b–310c and the chamber housing 302 are also $C_0$.

In FIG. 4B, the inclination sensing device 100 is placed on a tilted surface, so the chamber base 304 is at an angle with the horizon 400. Due to the toroidal shape of the chamber 306, the fluid 308 contained within the chamber 306 is free to flow throughout the chamber 306 as the device 100 is tilted. Therefore, in FIG. 4A, the first electrode 310a is shown to be more deeply immersed in the dielectric fluid 308 than the second electrode 310b. Accordingly, the capacitance between the first electrode 310a and the chamber housing 302 is $C_1$, which is greater than $C_0$, the capacitance when the device 100 is level. Because the second electrode 310b is less immersed in the dielectric fluid 308 than when the device 100 is level, the capacitance $C_2$ between the second electrode 310b and the chamber housing 302 is reduced to a value less than $C_0$. The capacitance between the third electrode 310c and the chamber housing 302 is $C_3$, which may be less than or greater than $C_0$, depending on whether the inclination of the device 100 results in the third electrode 310c becoming more or less immersed than when the device 100 is level.

Based on the capacitance values between each of the electrodes 310a–310c and the chamber housing 302, the direction and extent of inclination can be calculated. As shown in FIG. 3, the capacitance $C_1$ between the first electrode 310a and the housing 302 corresponds to a direction $A_1$, the capacitance $C_2$ between the second electrode 310b and the housing 302 corresponds to a direction $A_2$, and the capacitance $C_2$ between the third electrode 310c and the housing 302 corresponds to a direction $A_3$. These measured capacitance values are directly proportional to the extent to which the electrodes 310a–310c are immersed in the fluid 308, and the extent of immersion is directly related to the angle of inclination. Therefore, these three capacitance values can be used to determine the inclination along two orthogonal axes, x and y. The determined inclination along the x-axis and along the y-axis can then be used to calculate the overall direction of inclination and the total angle of inclination for the sensor 100.

The capacitance for each of the electrodes 310a–310c can be measured using the sensor assembly 202 and the processing module 206 as will be described in greater detail below. A single oscillator 220 may be used in conjunction with an electronically controllable switch 222, which can be, for example, a four-input CMOS switch. The oscillator 220 may comprise a CMOS Schmitt trigger inverter and a feedback resistor coupled from the inverter's output to its input. The period of oscillation for the oscillator 220 is dependent on the capacitance at the inverter's input. The switch 222 may be controlled by a controller 224 to couple the oscillator 220 with any of the electrodes 310a–310c to generate a signal corresponding to the capacitance between that electrode 310 and the housing 302. This arrangement can improve accuracy because any errors in the oscillator 220 become common to all electrode capacitance measurements.

The frequency of the signal from the oscillator 220 is inversely proportional to the capacitance of the electrodes 310, and the period of the signal from the oscillator 220 is directly proportional to the capacitance of the electrodes 310. This capacitance, in turn, corresponds to the extent to which each electrode 310 is immersed in the dielectric fluid 308. The signal from the oscillator 220 passes through a divider 226, which may be used to step down the frequency of the signal, and is passed to a microcontroller 224. The microcontroller 224 determines the period and/or the frequency of the signals coming from the oscillator 220 to generate a capacitance value for each of the electrodes 310.

The capacitance values from the three electrodes 310a–310c can be converted into separate x and y inclination values, indicative of the inclination of the device 110 along orthogonal x and y axes. This conversion can be performed in a variety of ways, as would be understood by one of ordinary skill in the art, with the following method being provided as one example.

First, the capacitance values, $C_1$, $C_2$, and $C_3$, from each of the three electrodes 310a–310c are summed to generate a total capacitance value, $C_{tot}$. Then, each of the capacitance values, $C_1$, $C_2$, and $C_3$, are divided by the total capacitance value $C_{tot}$ to determine the fractional capacitance of each electrode 310a–310c in the directions $A_1$, $A_2$, and $A_3$, respectively. The dielectric constant of the fluid medium 308 may be affected by the ambient temperature, and any change in the dielectric constant will affect the capacitance measurements. By using the fractional capacitances of each electrode, the effects of changing temperature on the capacitance readings and calibration process can be minimized or eliminated.

Next, the fractional capacitances in the three directions shown in FIG. 3, $A_1$, $A_2$, and $A_3$, are converted into the two orthogonal x and y directions. The overall capacitance in the x-direction, $C_x$, can be calculated as:

$$C_x = \left(\cos(30°) \times \frac{C_2}{C_{tot}}\right) - \left(\cos(30°) \times \frac{C_1}{C_{tot}}\right)$$

The overall capacitance in the y-direction, $C_y$, can be calculated as:

$$C_y = \left(\sin(30°) \times \frac{C_1}{C_{tot}}\right) + \left(\sin(30°) \times \frac{C_2}{C_{tot}}\right) - \left(\frac{C_3}{C_{tot}}\right)$$

Next, a calibration process can be performed to generate a compensation value to ensure that $C_x = C_y = 0$ when the device 100 is placed on a level surface. This can be performed by placing the device 100 on a level surface, measuring the capacitance values from each electrode 310a–310c, and calculating $C_x$ and $C_y$, as described above. If the calculated value for $C_x$ during calibration is not zero, then the calculated value is used as a compensation value, $P_x$, which is subtracted from the calculated value for $C_x$ to get an accurate inclination reading for the x-direction inclination during normal operation. Similarly, if the calculated value for $C_y$ during calibration is not zero, then the calculated value is used as a compensation value, $P_y$, which is subtracted from the calculated value for $C_y$ to get an accurate inclination reading for the y-direction. The compensation values $P_x$ and $P_y$ can be stored in a memory 228.

A second calibration step may be performed to convert the compensated values of $C_x$ and $C_y$ into values that are directly interpretable by a user to indicate the extent of inclination. For example, the compensated values of $C_x$ and $C_y$ can be converted and displayed in degrees or radians. This can be performed by placing the device 100 at a known inclination α in the x-direction. An x-direction scaling value $S_x$ is calculated by dividing the known inclination by the measured and compensated value of $C_x$, as shown by the following formula:

$$S_x = \frac{\alpha}{C_x - P_x}$$

In normal operation, this x-direction scaling value $S_x$ can be multiplied with the measured and compensated capacitance values to generate the inclination angle in the x-direction $C_x'$ in degrees.

$$C_x' = S_x \times C_x$$

The measured and compensated value for $C_y$ can be converted into degrees using the same scaling process. The overall angle of inclination can be determined by taking the square root of the sum of the squares of the x and y inclinations.

$$C_{tot}' \sqrt{(C_x')^2 + (C_y')^2}$$

In other embodiments, the scaling process can convert the capacitance values into a different unit indicative of the inclination, such as radians. The device 100 may also be configured to convert to multiple units and display the various units simultaneously or allow the user to select the desired display.

The direction of inclination can be determined computationally by various methods, depending on the number of direction arrows designed into the display 106 or the precision of the desired directional display. The process of selecting arrows for display can be based on several possible mechanisms, but in one embodiment, the compensated and scaled bipolar values $C_x'$ and $C_y'$ can be analyzed to determine which has the greatest absolute value. This value will define the quadrant within which the correct arrow will be selected. Analysis of the sign and value of the lower absolute magnitude value can be performed to determine the correct arrow or arrows to display.

Figure 6A:
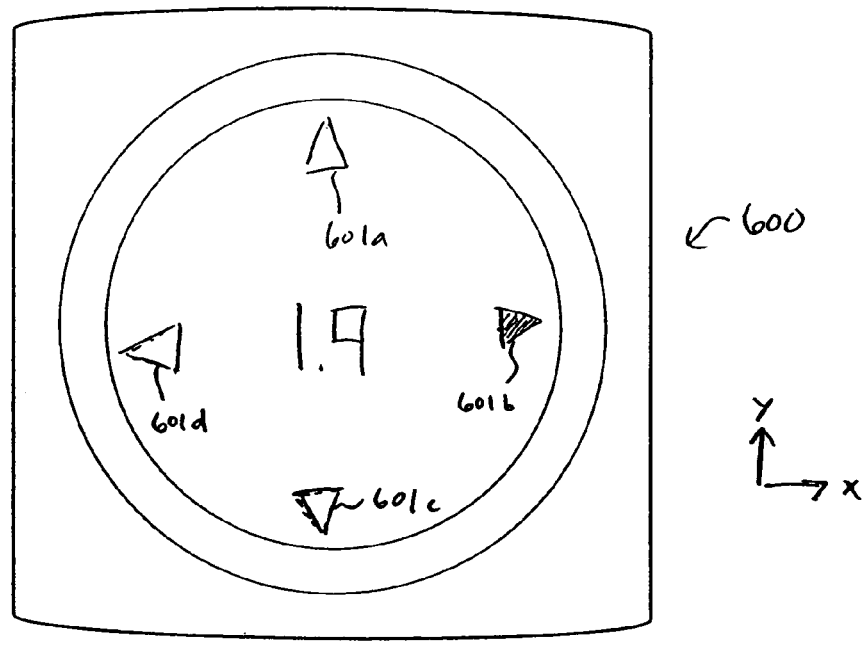
FIGS. 6A–6B show exemplary displays in accordance with embodiments of the present invention.

In the embodiment shown in FIG. 6A, the direction of inclination is indicated by displaying one of four arrows 601a–601d equally positioned about the display 600. If the absolute value of $C_x'$ is greater than the absolute value of $C_y'$, then either arrow 601b or 601d will be displayed, depending on the direction of inclination, as indicated by the sign (negative or positive) of $C_x'$. If not, then either arrow 601a or 601c will be displayed, depending on the direction of inclination, as indicated by the sign of $C_y'$.

Figure 6B:
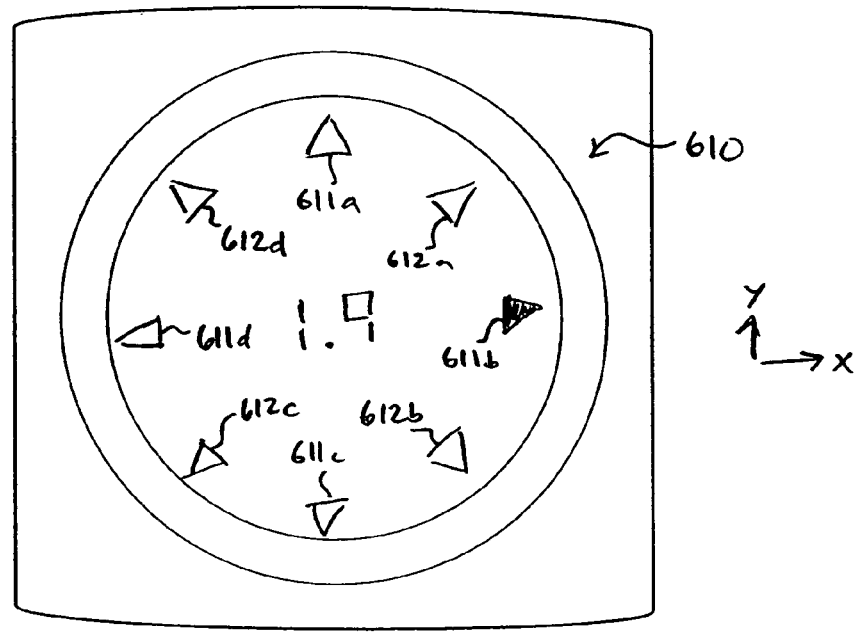

FIG. 6B shows another embodiment in which the display 610 includes eight arrows, each positioned 45° from the adjacent arrows. In this case, a more complicated decision making process can be used to decide which arrow to display. The eight arrows can be divided into two sets of four arrows each, corresponding to four primary directions (arrows 611a–611d) and four intermediate directions (arrows 612a–612d). The primary direction of inclination can be determined as described above with respect to FIGS. 6A–6B. If the axis showing the smallest absolute angle is greater in magnitude than the arctangent of 22.5 degrees of the absolute value of the axis showing the greatest absolute inclination angle, then an intermediate arrow should be displayed.

The display 600 described above can be, for example, a single LCD glass panel with a multidigit centrally located decimal display and direction arrows positioned radially about the display's center. This display 600 may comprise an approximately square LCD glass sandwich with patterned seven-segment elements 110 in the center for displaying the degrees of inclination in decimal form. The decimal display may include, for example, two digits with a decimal point between, allowing a maximum range of 0.0 to 9.9 degrees. The use of a two digit readout may be suitable to provide sufficient accuracy and range for certain applications while allowing for the largest and most readable display. However, the display need not be limited to two digits and a single digit or three or more digits can be used in other embodiments. Other types of displays can be used to convey the information about the angle and direction of inclination, and additional information may be also be provided on the display, such as, for example, a low battery indicator.

Surrounding the numerical digits is a radially positioned array of eight outwardly pointing arrows that may be selectively displayed by the processing module 206. These arrows are turned on in accordance with the detected direction of inclination, and can be configured to point toward the downhill direction as described above. In other embodiments, the display may include greater or fewer arrow elements and/or activate the arrow in the uphill direction rather than the downhill direction. Further, it is understood that although the number of arrow elements is limited, the number of directions that can be indicated can be many times greater than the number of elements. This can be accomplished, for example, by displaying two adjacent elements simultaneously for angles that fall between two arrow directions, or by intermittently flashing an arrow that is adjacent to a continuously displayed arrow to indicate a slight deviation from the continuously displayed arrow. The combination of a large numerical angle display and radially positioned direction arrows greatly assists in rapid, intuitive results interpretation.

As described above, the inclination sensing device 100 can simultaneously determine the two-dimensional direction of inclination and total angle of inclination. The numeric processing of the biaxial inclination information into a single, easily displayed and read inclination angle and direction can provide a valuable apparatus for quickly evaluating inclined surfaces.

In the embodiments described above, the dielectric fluid 308 may be, for example, water or propylene carbonate. In other embodiments, other types of dielectric fluids can be used. In some embodiments, any liquids having low viscosity, high dielectric constants, and low surface tension may be used.

Water has a relatively high dielectric constant, which can effectuate a more accurate capacitance measurement. Additives such as ethylene glycol may be desirable to lower the freezing point of the fluid. Further, a non-ionic surfactant, such as one chosen from a group of fluorinated organic polyethers, can be desirable as an additive to lower the surface tension of the dielectric fluid to provide good wetting of all surfaces within the chamber 306. However, the addition of surfactants may cause bubbles to form inside the chamber 306, which may impair the capacitance readings. In addition, to keep the conductivity of the fluid 308 as low as possible, a mixed anion/cation exchange resin may be added in very small quantity, such as in powdered form. Alternatively, a formed solid piece of mixed ion exchange resin may be included in the chamber 306 in a position where it disturbs the chamber's dielectric properties in a manner that is uniform to all electrodes.

As an alternative to water, a hydrophobic liquid can be used. Such liquids typically demonstrate a much lower dielectric constant than water. Although lacking in the desirable property of possessing a high dielectric constant, suitable materials can be chosen from a group of n-alcohols such as 1-octanol or 1-decanol, or phenyl alcohols such as 2-phenethanol or benzyl alcohol. Ketones, such as cyclohexanone or dihexyl ketone, may also be used. Esters of high molecular weight, such as dibutylphthallate or dioctylphthallate, could also be used. Finally, poly glycols such as dipropylene glycol or triethylene glycol could also be used. The above-listed fluids are merely examples and other fluids can be substituted, as would be understood to one of ordinary skill in the art.

The dielectric constant of many fluids, particularly ones with high dielectric constants, can be very temperature dependent. Further, the stray capacitance of the electronic switches and the threshold voltages of the Schmitt trigger inverter vary with temperature and the applied supply voltage. As a result, the specific value of capacitance at any of the electrode terminals may have a poor relationship to sensor position. To overcome the effects of temperature on the sensor measurements, a fifth selectable switch can be provided. This switch can be connected to an unterminated printed circuit wire similar to the leads that connect switches to each of the electrodes in the chamber 306. By making a capacitance measurement of this dummy connection through the same oscillator that all electrode measurements are made, a "background" capacitance measurement can be made that is typical of the stray switch capacitance. This "background" capacitance measurement can then be subtracted from the measurement of the individual electrode measurements to provide an adjusted electrode capacitance.

This can effectively remove the supply voltage and temperature dependent error due to switch stray capacitance and Schmitt trigger thresholds.

The bipolar output for a given axis, in the embodiments described above, provides an output that is proportional to the tangent of inclination, but has limits defined by the dimensions of the partially immersed electrodes. When an inclination angle is reached that causes one electrode to be completely immersed and the opposing electrode to fail to be immersed at all, the effective inclination measurement range of the device has been exceeded. For the purpose of measuring inclinations that deviate only a small amount from level, this approach toward sensor design provides a compact and reliable solution. Depending on the design of the sensor 300, the maximum measuring range can be, for example ±10° of inclination in any direction. In other embodiments, the shape and arrangement of the housing 302 and the electrodes 310 can be modified to accommodate a greater range of inclination angles.

The annular shape of the chamber 306 and the positioning of the electrodes within the annular chamber 306 can provide a more stable and accurate inclination measurement. Because the capacitance is measured between the electrode 310 and both the inner wall 312 and outer wall 314 of the housing 302, any capacitance changed due to the misalignment or displacement of the electrode 310 may be minimized. For example, if the electrode 310 is misaligned such that the electrode 310 is closer to the outer wall 314 than the inner wall 312, the capacitance between the electrode 310 and the outer wall 314 is decreased, while the capacitance between the electrode 310 and the inner wall 312 is increased. However, the overall affect upon the capacitance measurement is offset because the measurement is taken from both the outer wall 314 and the inner wall 312, thereby causing the changes in capacitance to cancel each other out.

While the invention has been described in terms of particular embodiments and illustrative figures, those of ordinary skill in the art will recognize that the invention is not limited to the embodiments or figures described. For example, in the above embodiment, the processing module 206 utilizes an oscillator 220 and microcontroller 224 to determine the capacitance values for the electrodes 310 in the sensor 202. In other embodiments, the electrical characteristic being measured in the sensor 202 can be converted from analog into digital form for display using a variety of methods. For example, successive approximation, single slope integration, dual slope integration, voltage to frequency conversion and counting, delta-sigma, as well as other well-known conversion techniques may be used.

In accordance with other embodiments, different types of sensors could be used, including suspended weights with devices to determine the resting position of the weights; a force feedback device acting against a reference mass; an enclosure partially filled with a fluid and illuminated with light, whereby light sensors receiving light reflected or refracted off the surface of the fluid-gas interface is determined; or any other device that is capable of producing an electrical output that is related to inclination. Such sensor outputs can be converted into binary form through an analog to digital process.

Figure 7:
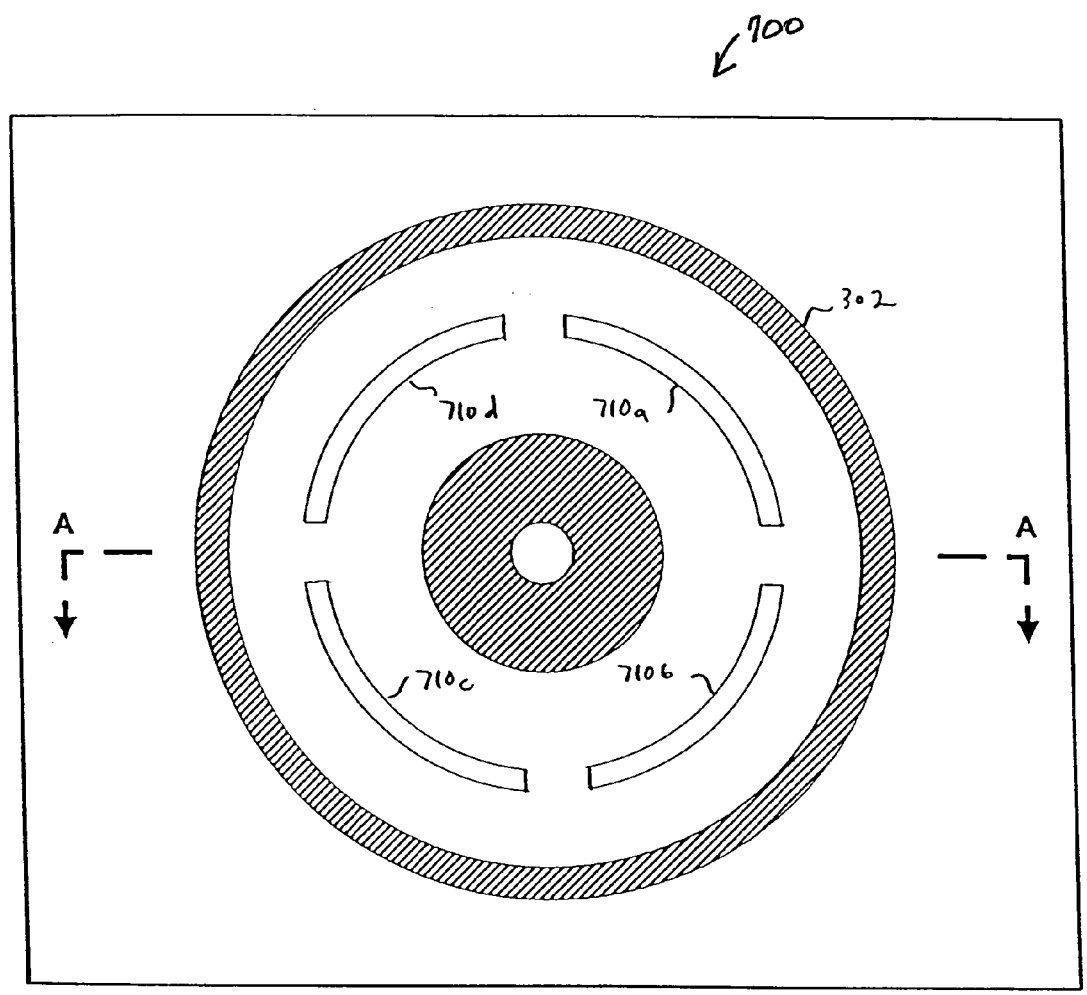
FIG. 7 is a top cross-sectional view of an exemplary inclination sensor in accordance with other embodiments of the present invention.

In yet other embodiments, a inclination sensor can include four or more electrodes, such as sensor 700 having electrodes 710a–710d, as shown in FIG. 7. Here, capacitance measurements between each of the four electrodes 710a–710d and the housing 302 can be taken and used to determine the angle and direction of inclination of the device. Greater or fewer electrodes can be used in the various embodiments.

Therefore, it should be understood that the invention can be practiced with modification and alteration within the spirit and scope of the appended claims. The description is thus to be regarded as illustrative instead of limiting on the invention.

I claim:

1. An inclination measurement and display device, comprising:
   a conductive chamber containing a fluid, wherein the conductive chamber comprises an annular chamber having an inner wall and an outer wall;
   a plurality of electrodes provided in the chamber, wherein at least three electrodes of said plurality of electrodes are partially immersed in the fluid, each of the at least three electrodes including more than one side, and more than one side of each of the at least three electrodes being partially immersed in the fluid, and wherein each of said plurality of electrodes is provided approximately equidistantly from the inner wall and the outer wall of the annular chamber;
   a processing module configured to measure an electrical characteristic between each of the plurality of electrodes and the conductive chamber and to determine an overall angle of inclination and the direction of inclination of the chamber; and
   a display for displaying a numerical value corresponding to the overall angle of inclination and an indication of the direction of inclination.

2. The device of claim 1, wherein said indication of the direction of Inclination comprises a plurality of Indicators positioned radially about said numerical value.

3. The device of claim 1, wherein the electrical characteristic comprises capacitance.

4. The device of claim 1, wherein the fluid comprises a dielectric fluid.

5. The device of claim 1, wherein said plurality of electrodes comprises three electrodes spaced approximately equidistantly from each other In the annular chamber.

6. The device of claim 1, wherein said plurality of electrodes comprise conductive plates provided in the annular chamber.

7. The device of claim 1, wherein said processing module comprises:
   an oscillator; and
   a microcontroller configured to count the oscillator's output cycles.

8. The device of claim 7, wherein said processing module further comprises;
   a controllable switch for selectively coupling the oscillator with each of the plurality of electrodes.

9. An inclination measurement and display device, comprising:
   an enclosure having a reference surface;
   an inclination sensor provided in the enclosure and being configured to measure a first electrical characteristic indicative of an inclination of the reference surface along a first axis and a second electrical characteristic indicative of an inclination of the reference surface along a second axis, wherein the inclination sensor outputs a first signal corresponding to the first measured electrical characteristic comprising capacitance and a second signal corresponding to the second measured electrical characteristic, the inclination sensor including at least one electrode having more than one side partially immersed in a fluid, and the inclination sensor comprising a conductive housing defining an annular chamber having an inner wall and an outer wall, a plurality of electrodes provided in the chamber, and a dielectric fluid provided in the chamber;

a processing module for receiving the first and second signals from the inclination sensor and processing the first and second signals to determine the overall angle of inclination and the direction of inclination of the reference surface; and a display for displaying a numerical value corresponding to the overall angle of inclination and a directional indication corresponding to the two-dimensional direction of inclination.

10. The device of claim 9, wherein said directional indication comprises a plurality of indicators positioned radially about said numerical value.

11. The device of claim 9, wherein each of said plurality of electrodes are provided approximately equidistantly from the inner wall and the outer wall of the annular chamber.

12. The device of claim 9, wherein said plurality of electrodes comprise conductive plates provided in the annular chamber.

13. The device of claim 9, wherein:
said inclination sensor comprises a plurality of electrodes.

14. The device of claim 13, wherein said processing module comprises:
an oscillator; and
a microcontroller configured to count the oscillator's output cycles.

15. The device of claim 14, wherein said processing module further comprises:
a controllable switch far selectively coupling the oscillator with each of the plurality of electrodes.

16. A method of measuring inclination, comprising:
measuring a first electrical characteristic indicative of an inclination of a reference surface of an enclosure along a first axis and a second electrical characteristic indicative of an inclination of the reference surface along a second axis, wherein measuring the first and second electrical characteristics include partially immersing more than one side of at least one electrode in a fluid and measuring an electrical characteristic of the fluid contained in a chamber in three non-parallel directions;
outputting a first signal corresponding to the first measured electrical characteristic and a second signal corresponding to the second measured electrical characteristic;
processing the first and second signals to determine the overall angle of inclination and the direction of inclination of the reference surface;
displaying a numerical value corresponding to the overall angle of inclination; and
displaying an indication of a direction of inclination.

17. The method of claim 16, wherein said measuring the first electrical characteristic and the second electrical characteristic comprises:
measuring an electrical characteristic of the fluid contained in a chamber in a plurality of directions.

18. A method of measuring inclination, comprising:
measuring an electrical characteristic of a fluid contained in a chamber in a plurality of directions using at least three electrodes partially incensed in the fluid, wherein each of the at least three electrodes include more than one side more than one side of each of the at least three electrodes are partially immersed in the fluid, and the chamber comprises an annular chamber having an inner wall and an outer wall;
processing the measured electrical characteristics to determine an overall angle of inclination and the direction of inclination of the chamber;
displaying a numerical value corresponding to the overall angle of inclination; and
displaying an indication of a direction of inclination.

19. The method of claim 18, wherein said measuring the electrical characteristic comprises:
in each of the plurality of directions, measuring a capacitance value between a pair of electrodes immersed in the fluid contained in the chamber, wherein the fluid in a dielectric fluid.

20. The method of claim 18, wherein:
said measuring the electrical characteristic comprises measuring a capacitance value between each of at least three electrodes and the chamber to generate three capacitance values; and
said processing the measured electrical signals comprises processing the three capacitance values to determine the overall angle of inclination and the direction of inclination of the chamber.

21. The method of claim 20, wherein:
said processing the measured electrical signals comprises processing the three capacitance values to calculate a capacitance value In two non-parallel directions.

* * * * *